(12) United States Patent
Cheikh et al.

(10) Patent No.: US 9,669,667 B2
(45) Date of Patent: Jun. 6, 2017

(54) LOW-FREQUENCY EMISSION ELECTRONIC UNIT EMITTING TO A MOBILE WHEEL ELECTRONIC UNIT OF A VEHICLE AND ASSOCIATED LOW-FREQUENCY SIGNAL TRANSMISSION METHOD

(71) Applicants: CONTINENTAL AUTOMOTIVE FRANCE, Toulouse (FR); CONTINENTAL AUTOMOTIVE GmbH, Hannover (DE)

(72) Inventors: Mohamed Cheikh, Toulouse (FR); Sebastien Kessler, Dremil-Lafage (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/968,035

(22) Filed: Dec. 14, 2015

(65) Prior Publication Data
US 2016/0176247 A1    Jun. 23, 2016

(30) Foreign Application Priority Data

Dec. 17, 2014 (FR) .................................... 14 62588

(51) Int. Cl.
| | | |
|---|---|---|
| *B60C 23/00* | (2006.01) | |
| *B60C 23/02* | (2006.01) | |
| *B60R 25/10* | (2013.01) | |
| *G08B 13/00* | (2006.01) | |
| *H04Q 1/30* | (2006.01) | |
| *H01Q 1/32* | (2006.01) | |
| *B60C 23/04* | (2006.01) | |
| *H01Q 1/22* | (2006.01) | |

(52) U.S. Cl.
CPC ........ *B60C 23/0452* (2013.01); *B60C 23/044* (2013.01); *B60C 23/0444* (2013.01); *H01Q 1/2241* (2013.01)

(58) Field of Classification Search
CPC .............. B60C 23/0452; B60C 23/044; B60C 23/0408; H01Q 1/2241; H01Q 7/00;
(Continued)

(56) References Cited

U.S. PATENT DOCUMENTS 4,210,859 A    7/1980 Meretsky et al.
6,538,566 B1 *    3/2003 Morand .............. B60C 23/0413
340/442

(Continued)

FOREIGN PATENT DOCUMENTS

AU          620160 B2    4/1990
EP      0 365 919 A1    5/1990
(Continued)

OTHER PUBLICATIONS

French Search Report, dated Jul. 24, 2015, from corresponding French Application.

*Primary Examiner* — George Bugg
*Assistant Examiner* — Munear Akki
(74) *Attorney, Agent, or Firm* — Young & Thompson

(57) ABSTRACT

A low-frequency emission electronic unit (20') includes two low-frequency antennas (B1, B2). The second antenna (B2) is passive and resonant, oriented along the main axis (Y) of the first low-frequency antenna (B1) and is adapted to generate two low-frequency fields (D2, D2') at right angles to the field (D1) emitted by the first antenna (B1). The low-frequency emission electronic unit (20') makes it possible to reduce the zones of rupture of reception of the low-frequency signals by the wheel unit (13) situated in proximity in which the low-frequency signals emitted by the low-frequency emission electronic unit are not received by the closest wheel unit (13). A low-frequency signal transmission method alternating the emissions of waves by the two antennas (B1, B2) is also described.

9 Claims, 4 Drawing Sheets

(58) Field of Classification Search
CPC .. H01Q 7/06; H01Q 7/08; H01Q 1/32; H01Q 1/3291; H01Q 1/325; G01D 5/2013; G01D 5/145
USPC ....... 340/447, 445, 442, 426.33; 324/207.16, 324/207.25; 343/711, 713, 787, 788, 741, 343/748, 866, 867, 742; 116/34 R, 34 A; 73/48, 146–146.8
See application file for complete search history.

(56) References Cited

U.S. PATENT DOCUMENTS

| | | | |
|---|---|---|---|
| 7,392,119 B2* | 6/2008 | Allard | B60C 23/0416 340/445 |
| 2005/0071057 A1* | 3/2005 | Lin | B60C 23/0413 701/29.6 |
| 2006/0259214 A1 | 11/2006 | McQuade | |
| 2007/0109210 A1 | 5/2007 | Bacquet | |
| 2008/0197837 A1 | 8/2008 | Dulac | |
| 2011/0304452 A1* | 12/2011 | Lickfelt | B60C 23/0418 340/447 |
| 2013/0179113 A1* | 7/2013 | Guinart | B60C 23/0416 702/141 |
| 2014/0002258 A1* | 1/2014 | Chen | B60C 23/0455 340/447 |

FOREIGN PATENT DOCUMENTS

| | | |
|---|---|---|
| EP | 1 315 178 A1 | 5/2003 |
| FR | 2 864 354 A1 | 6/2005 |
| FR | 2 888 656 A1 | 1/2007 |
| JP | S6235702 A | 2/1987 |
| JP | 2009-32015 A | 2/2009 |
| WO | 01/41319 A1 | 6/2001 |

* cited by examiner

LOW-FREQUENCY EMISSION ELECTRONIC UNIT EMITTING TO A MOBILE WHEEL ELECTRONIC UNIT OF A VEHICLE AND ASSOCIATED LOW-FREQUENCY SIGNAL TRANSMISSION METHOD

FIELD OF THE INVENTION

The present invention relates to an electronic unit emitting low-frequency waves to a mobile wheel electronic unit of a vehicle and to a method of transmitting low-frequency signals between said emission electronic unit (hereinafter called "emitting unit") and the receiving wheel electronic unit (hereinafter called "wheel unit").

BACKGROUND OF THE INVENTION

The wheel electronic units (called "wheel units") currently have the functionality of informing a centralized electronic control unit (hereinafter called "central unit") concerning various parameters relating to the wheel, such as the tire pressure, the temperature of the gas inside of the tire or wheel temperature, the footprint of the tire, for example the length of this print along the plane of the wheel. These wheel units 13 (cf. FIG. 1) are generally fitted to each wheel 11 of the vehicle 10 (cf. FIG. 3) and are generally fixed inside the tire against its tread, and are provided with means that make it possible to record the moment when this tread comes into contact with the ground S and the moment when it leaves the ground S, by the induced radial displacement of the tread. These means are, for example, an accelerator or an impact sensor or similar associated with the wheel unit 13, which measures, in the case of the accelerometer for example, the difference in radial acceleration when it enters into contact with the ground S and leaves this contact.

The wheel unit 13 is provided with at least one pressure sensor 17 (often also a temperature sensor), and also comprises (in a nonlimiting manner):

a microprocessor,
an antenna 15 for receiving low-frequency LF signals,
an antenna for emitting radiofrequency RF signals (not represented) (cf. FIG. 3), and
a battery (not represented) powering all of these elements.

The wheel unit 13 can also comprise other sensors as cited above, for example an accelerometer.

The central unit 12, mounted on the vehicle V, is for its part provided with at least:

a radiofrequency receiving antenna 16 (cf. FIG. 3),
a computer with microprocessor, and it is linked electrically to four low-frequency emission electronic units 20 (cf. FIG. 3), that is to say to four emitting units 20.

This central unit 12 is powered by the battery of the vehicle V.

Each of the emitting units 20 is situated in a fixed manner on the vehicle V close to a wheel unit 13.

Each emitting unit 20 comprises a low-frequency emission antenna, and a microcontroller linked electrically to said emission antenna. The emitting unit 20 can, in certain cases, comprise only the low-frequency emission antenna, linked electrically to the computer, situated in the central unit 12.

At fixed frequency, the central unit 12 controls the sequential sending of low-frequency LF interrogation signals via the emitting units to each of the wheel units 13.

Each wheel unit 13 then transmits sequentially, one after the other, radiofrequency RF signals (generally high frequency) to the central unit 12 in order for the latter to inform the driver of any abnormal measured parameters, and also in order for this central unit 12 to be able to locate the position of each wheel unit 13 on the vehicle V throughout the life of the tire associated with the wheel 11, and do so even if the position of the wheel 11 is changed on the vehicle V.

During the rotation of a wheel 11, and over one revolution of the wheel 11, there are generally parts of trajectories of the wheel unit 13 in which the reception by the wheel unit 13 of the LF signals sent by the closest emitting unit 20 does not work, called low-frequency rupture zones Zo (cf. FIG. 1), which correspond to an RF signal reception rupture zone. This can be true for each wheel 11 of the same vehicle V in a different and unpredictable manner. There is, however, by convention, a limited acceptance of the number and the duration of the rupture zones Zo for a wheel 11 revolution. For example, a rupture zone Zo of approximately 1° maximum is generally accepted for each wheel 11 revolution. In certain particular cases, this number may be raised to two rupture zones Zo each of the order of 1° maximum for each wheel 11 revolution.

FIG. 2 illustrates an example of intensity RFi of the low-frequency LF signal received by the reception antenna 15 of the wheel unit 13 according to the angle of rotation θ of the wheel, over a complete wheel revolution (360°), also called reception pattern. In this example, the rupture zone Zo appears in the regions of 225°, the intensity RFi of the low-frequency LF signal is then insufficient for the wheel unit 13 to receive the LF signal.

A vehicle V without rupture zone Zo and in which the rate of LF reception by the wheel unit 13 reaches 100% is in fact not representative of the reality. In effect, the wheel unit 13 comprises a single low-frequency reception antenna 15, and the emitting unit 20, for its part, has a single low-frequency LF signal emitting antenna, generally in the form of a longitudinal copper coil surrounding a ferrite, which emits LF signals in a single direction. The rupture zone Zo corresponds to a momentary position of the wheel unit 13 on the wheel 11, for which the orientation of the wheel unit 13 is such that the direction of reception of the receiving antenna 15 of said wheel unit 13 does not allow the reception of the low-frequency LF signals sent by the emitting unit 20.

One prior art solution consists in equipping the emitting unit 20 with a second emission antenna, fixed at right angles to the emitting antenna already present in the emitting unit 20. The two antennas have emission directions at right angles. This makes it possible to increase the probability of reception of the LF signals by the wheel unit 13 and reduce the rupture zone Zo. With a second antenna, the rate of reception of the LF signals by the wheel unit 13 comes close to 100%.

However, the addition of a second low-frequency antenna in the emitting unit 20 with its associated electronic control circuit represents a not-inconsiderable cost. The emitting unit 20 also becomes more bulky because of the additional space allocated for the second antenna, at right angles to the antenna already present, so its incorporation in the vehicle V becomes less easy.

Another prior art solution consists in equipping the wheel unit 13 with a second LF signal receiving antenna, at right angles to the receiving antenna 15 already present in the wheel unit 13. However, this addition represents a real bulk drawback, and the incorporation of the wheel unit 13 in the tire 11 against the tread becomes difficult.

SUMMARY OF THE INVENTION

The present invention proposes an electronic unit emitting low-frequency waves 20, fixed to a vehicle V, to a mobile wheel electronic unit of said vehicle V and a transmission method applicable to one or more low-frequency LF signals between said emission electronic unit 20 and the wheel unit 13 that makes it possible to improve the efficiency of reception of said low-frequency waves by the wheel unit 13. Improving the receiving efficiency amounts to ensuring that the low-frequency LF signals transmitted can be statistically received by the wheel unit 13 within a defined minimum time period, and regardless of the speed of the vehicle up to a predefined maximum speed, for example 250 km/h.

The invention proposes a low-frequency emission electronic unit emitting to a mobile wheel electronic unit of a vehicle, fixed to said wheel, said low-frequency emission electronic unit comprising:
a microcontroller,
a first low-frequency emission antenna, oriented along an axis, connected to the microcontroller, having a power supply voltage, and emitting a first low-frequency field,
said low-frequency emission electronic unit being noteworthy in that it further comprises:
a second passive low-frequency antenna arranged along the axis of the first antenna, situated in a zone of reception of the first low-frequency field, regardless of the power supply voltage of the first antenna, and comprising a first part and a second part, linked electrically together, separated by a gap having a length, the two parts being adapted to emit low-frequency fields of opposite directions, and directed toward one another,
means for adapting a frequency of the second antenna to the frequency of the first antenna,
means for regulating the power supply voltage of the first antenna;
means for controlling the adaptation means and the regulation means.

Shrewdly, the first antenna and the second antenna are coaxial and wound around the same ferrite.

In a preferential embodiment, the voltage regulation means comprise:
a first two-way switch, connected on one side to a voltage generator incorporated in the microcontroller, and connected on the other side to:
a first circuit of nominal voltage, comprising a first resistor,
a second circuit of voltage lower than the nominal voltage, comprising a second resistor;
the first switch having a first position in which the first antenna is connected to the first circuit and a second position in which the first antenna is connected to the second circuit.

Also, the adaptation means comprise
a second switch,
a frequency adaptation circuit comprising:
a capacitor,
a third resistor,
the second switch having a closed position in which the second antenna is connected to the adaptation circuit and an open position in which the second antenna is disconnected from the adaptation circuit.

Preferentially, a length of the first part is equal to a length of the second part and the length of the gap is between $\frac{1}{8}^{th}$ and $\frac{5}{8}^{th}$ of the length of the first part or of the length of the second part.

The invention relates also to a method for transmitting low-frequency signals from a low-frequency emission electronic unit to a mobile wheel electronic unit of a vehicle, fixed to said wheel, said low-frequency emission electronic unit comprising:
a microcontroller,
a first low-frequency emission antenna oriented along an axis, connected to the microcontroller, having a power supply voltage, and emitting a first low-frequency field,
the method being noteworthy in that, in a preliminary step, the low-frequency emission electronic unit is equipped:
with a second passive low-frequency antenna arranged along the axis of the first antenna, situated in a zone of reception of the first low-frequency field, regardless of the power supply voltage of the first antenna, and comprising a first part and a second part, linked electrically together, separated by a gap having a length, the two parts being adapted to emit low-frequency fields of opposite directions, and directed toward one another,
means for adapting a frequency of the second antenna to the frequency of the first antenna,
means for regulating the power supply voltage of the first antenna; making it possible to regulate the power supply voltage of the first antenna either to a nominal voltage or to a voltage lower than the nominal voltage,
means for controlling the adaptation means and the regulation means,
said method comprising the following steps:
step 1: activation of the regulation means in order to power the first antenna with a nominal voltage for a first predetermined duration,
step 2: deactivation of the regulation means,
step 3: activation of the regulation means in order to power the first antenna with a voltage lower than the nominal voltage and activation of the adaptation means simultaneously for a second predetermined duration,
step 4: deactivation of the regulation means and deactivation of the adaptation means simultaneously,
step 5: repetition of the steps 1 to 4.
Preferentially:
step 1 consists in connecting the first switch to the circuit of nominal voltage,
step 2 consists in disconnecting the first switch from the circuit of nominal voltage,
step 3 consists in connecting the first switch to the circuit of voltage lower than the nominal voltage and in closing the second switch,
step 4 consists in disconnecting the first switch from the circuit of voltage lower than the nominal voltage simultaneously with the opening of the second switch.

The invention applies also to any system for monitoring the pressure of the tires, comprising a central unit, at least one wheel electronic unit, and at least one low-frequency emission electronic unit according to any one of the features listed above.

Finally, the invention relates to any motor vehicle comprising a low-frequency emission electronic unit according to one of the features listed above.

BRIEF DESCRIPTION OF THE DRAWINGS

Other features and advantages of the invention will become apparent on reading the following description and on studying the attached drawings in which.

DETAILED DESCRIPTION OF THE INVENTION

Figure 3:
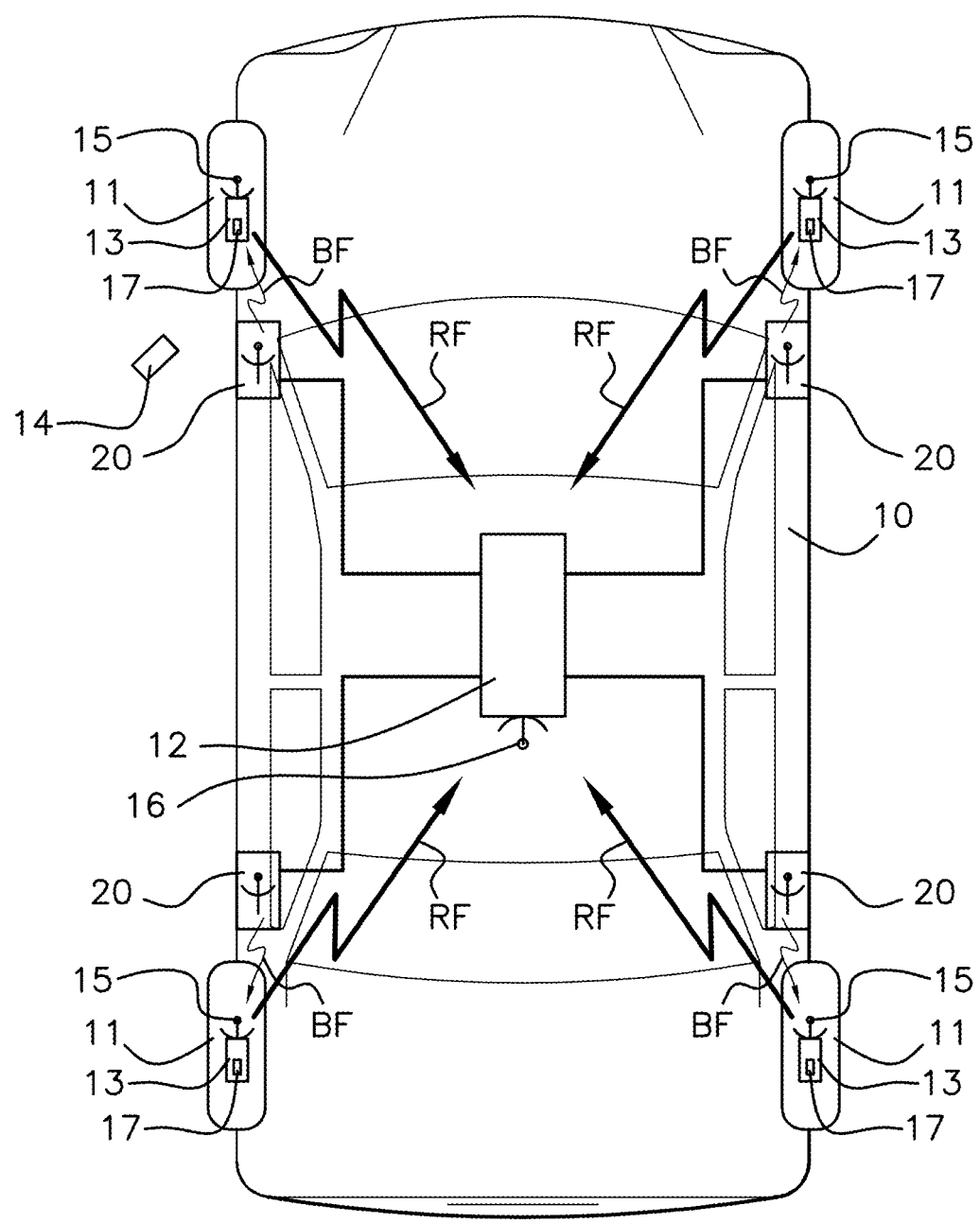
FIG. 3 represents a schematic view of a vehicle equipped with wheel units and a central unit.

According to the embodiment represented in FIG. 3, a vehicle 10 is conventionally provided with four tires 11. Each of these tires 11 is equipped with a wheel unit 13. The vehicle 10 is also provided with a central unit 12 and four low-frequency emission electronic units 20.

The central unit 12, the wheel units 13 and the emitting units 20 belong to a system for monitoring the pressure of the tires 11. This system is adapted to regularly measure the pressure (and the temperature) prevailing in the tires, so as to inform the driver of the vehicle 10 of any abnormality. Each wheel unit 13 comprises, for this purpose, a pressure sensor 17 and a temperature sensor (not represented). Since this system is known per se, it will not be detailed here.

The emitting units 20 each send, in turn, at the request of the central unit 12, an interrogation method to the wheel unit 13 located closest. This interrogation method is sent by low-frequency waves.

Wheel units 13 then measure the temperature and the pressure prevailing in the tires 11 using the pressure 17 and temperature sensors and emit the measured values (possibly preprocessed) to the central unit 12 by RF (radiofrequency) signals of frequency f of the order of 433 MHz or 315 MHz, using their radiofrequency emission antenna 15. The central unit 12 receives, using a radiofrequency antenna 16, the RF signals emitted by the wheel units 13, processes them and informs the driver of any abnormality.

It should be noted that the central unit 12 and the wheel units 13 are not connected together by a wired network. Similarly, the emitting units 20 and the wheel units 13 are not connected together by a wired network.

Figure 1:
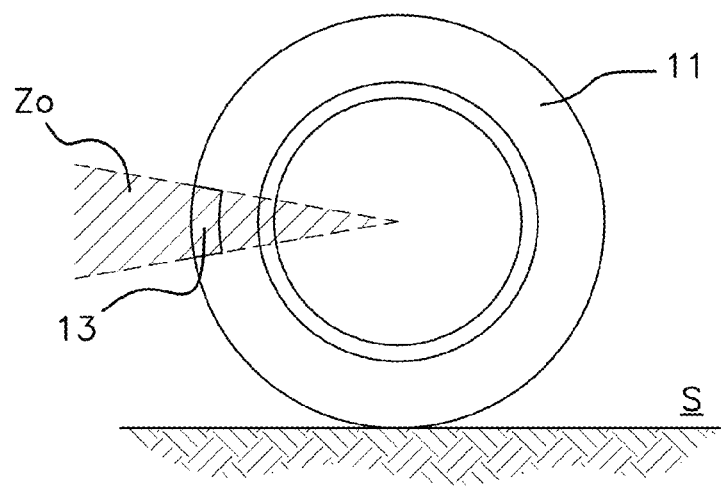
FIG. 1, explained previously, represents a schematic view of a wheel equipped with a wheel unit 13, illustrating a rupture zone Zo, according to the prior art, FIG. 2, explained previously, represents a schematic view of the intensity of the low-frequency signal received by the wheel unit according to the angle of rotation of the wheel, according to the prior art.
Figure 2:
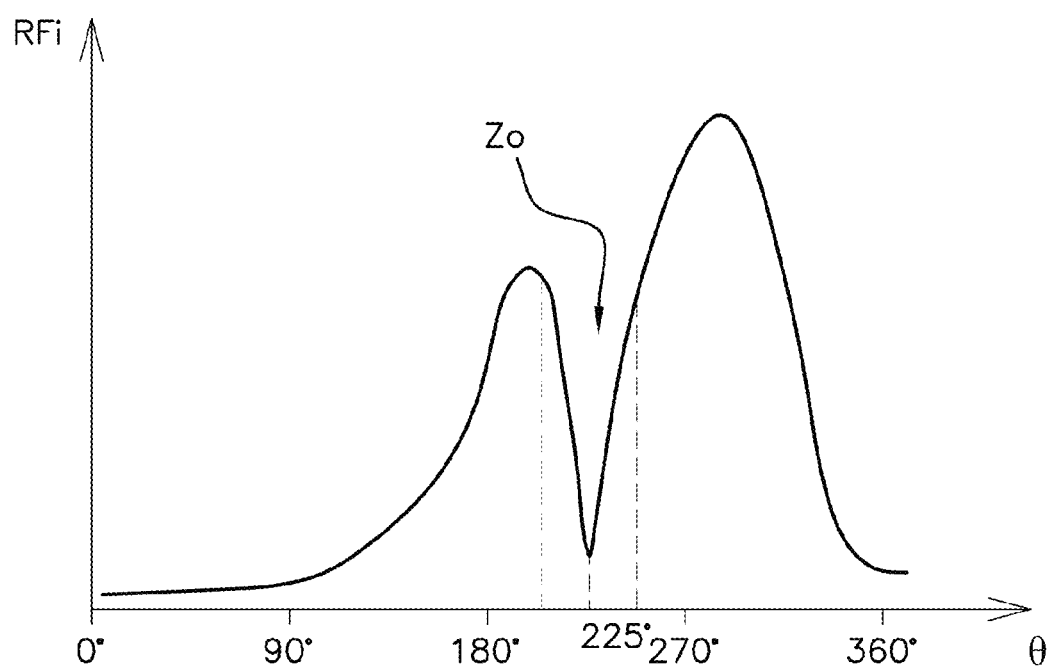

As explained previously, the wheel unit 13 of the prior art, equipped with just one antenna 15 has the drawback of having a rupture zone Zo (cf. FIG. 1) on the wheel 11 in which the low-frequency LF signals emitted by the antenna of the emitting unit 20 are not received by the wheel unit 13.

Figure 4:
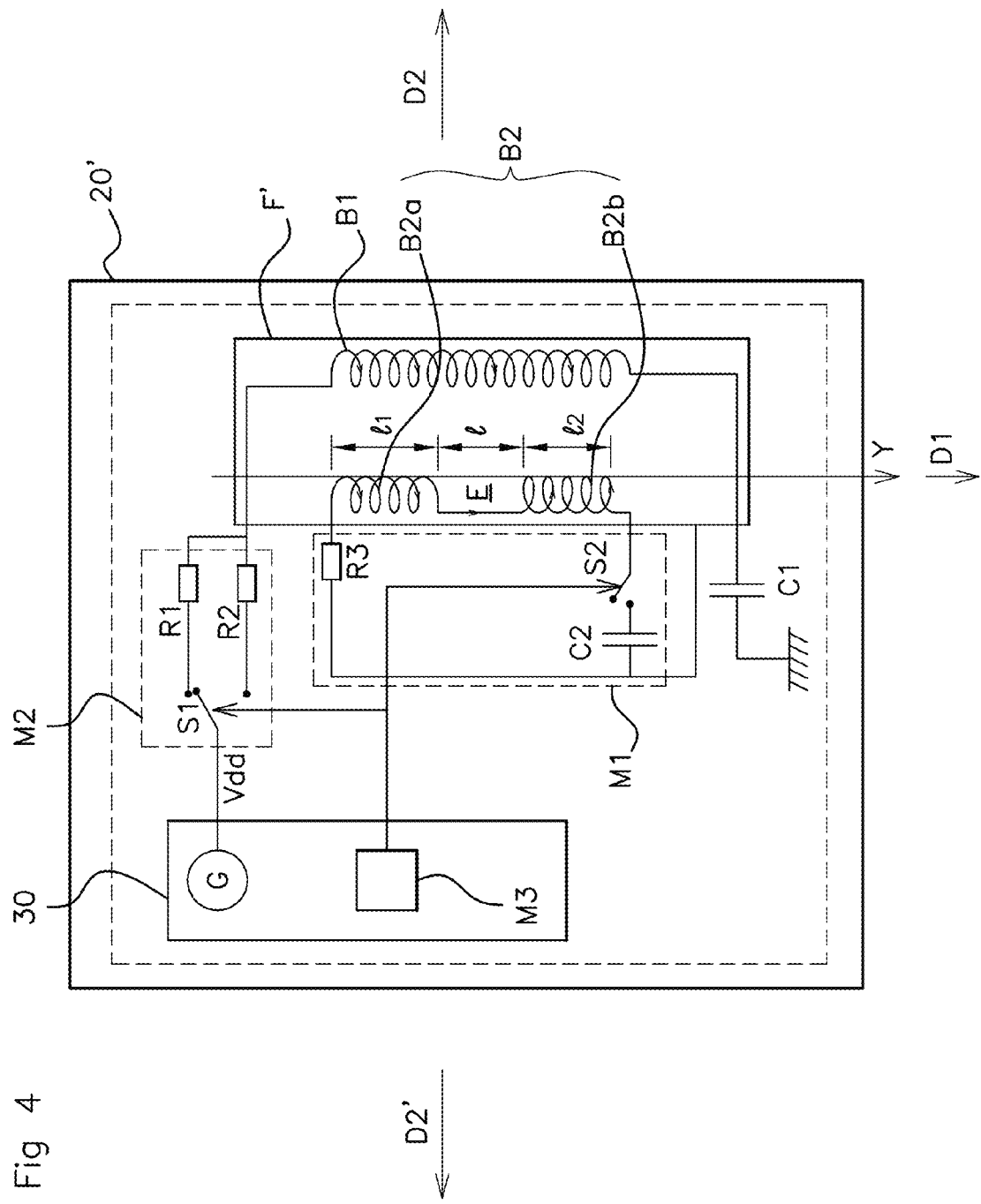
FIG. 4 represents a schematic view of a low-frequency emission electronic unit according to the invention.

To mitigate this drawback, the invention proposes an emitting unit 20' as illustrated in FIG. 4. The emitting unit 20' comprises, as in the prior art:
 a microcontroller 30,
 a first low-frequency emission antenna B1 of frequency f, in the form of a copper coil, surrounding a ferrite F', extending along an axis Y. Said first antenna B1 is powered on one side with alternating voltage Vdd by a voltage generator G incorporated in the microcontroller 30 and on the other side said first antenna B1 is connected to a capacitor C1, which is in turn linked to the ground. The capacitor C1 makes it possible to adjust the emission frequency f of said first antenna B1.

For explanatory purposes, it is considered in this example that the emitting unit 20' comprises a microcontroller 30 which manages the emission of the low-frequency signals by the first antenna B1. Generally, the emitting unit 20' comprises only one emitting antenna B1 which is linked to the microcontroller of the central unit 12, said microcontroller managing the emission of the low-frequency signals by the emitting unit 20'.

The first antenna B1 generates a first low-frequency field D1 directed along the axis Y (cf. FIG. 4).

According to the invention, the emitting unit 20' further comprises:
 a second low-frequency emission antenna B2 of frequency f',
 means M1 for adapting the frequency f' of the second antenna B2 to the frequency f of the first antenna B1,
 means M2 for regulating the power supply voltage Vdd of the first antenna B1,
 control means M3, adaptation means M1 and regulation means M2, for example incorporated in the microcontroller 20'.

The second antenna B2 is a passive antenna. It is not supplied with voltage. It, for example, takes the form of a copper winding.

The second antenna B2 is situated in the zone of reception of the low-frequency field D1 emitted by the first antenna B1, regardless of the power supply voltage Vdd of the first antenna B1.

The second antenna B2 consists of a single copper wire. It comprises two parts B2a and B2b, for example two copper windings, linked electrically together by the copper wire and separated by a gap E of length l. The two parts, the first winding B2a and the second winding B2b are designed or adapted, when the second antenna B2 emits low-frequency waves (the conditions of emission of the second antenna B2 are explained below), to generate low-frequency fields C2a, C2b of opposite directions and directed toward one another.

For example, the first winding B2a of length l1 is produced in a first direction of winding, and the second winding B2b of length l2 is produced in the direction opposite the first direction of winding. The second winding B2b is separated from the first winding B2a by the gap E of length l, and linked electrically to the first winding by said copper wire along said gap E. More specifically, the copper wire is wound neither in the first direction nor in the opposite direction at the gap E. Preferentially, the lengths of the two windings B2a, B2b are equal to each other, l1 equals l2, and the length l of the gap E is between $1/8^{th}$ and $5/8^{th}$ of the length l1 of the first winding B2a, or of the length l2 of the second winding B2b (cf. FIGS. 4 and 5).

Figure 5:
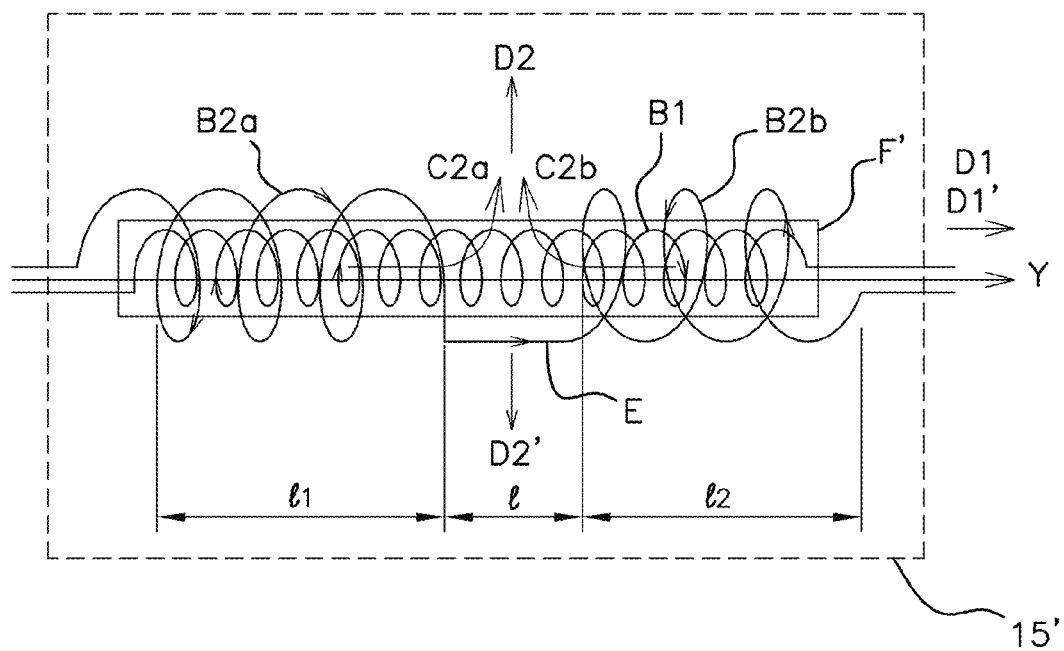
FIG. 5 represents a schematic view of the first antenna and of the second antenna of the low-frequency emission electronic unit according to the invention.

As illustrated in FIG. 5, the first winding B2a generates a first low-frequency field C2a directed along the axis Y, toward the gap E. The second winding B2b generates a second low-frequency field C2b, the direction of which, along the axis Y, is opposite that of the first low-frequency field C2a and directed toward the gap E.

The two low-frequency fields C2a, C2b are directed toward one another; they meet at the gap E and generate a second low-frequency field D2 and a third low-frequency field D2' at right angles to the axis Y and oriented at 180° to one another (cf. FIG. 5).

Thus, the second antenna B2, through its geometry (two windings B2a, B2b producing fields directed toward one another), emits two low-frequency fields D2 and D2' at right angles to the axis Y, that is to say at right angles to the first low-frequency field D1 emitted by the first antenna B1.

The means M2 for regulating the power supply voltage Vdd upstream of the first antenna B1 consists of a first two-way switch S1 linked on one side to the voltage generator G, and on the other side, depending on the position of said switch S1, to one of two circuits mounted in parallel, both linked to a first end of the first antenna B1 (cf. FIG. 4):
  a first circuit of nominal voltage, comprising a first resistor R1,
  a second circuit of voltage lower than the nominal voltage comprising a second resistor R2.
With R2<<R1.

In another embodiment, the means M2 for regulating the power supply voltage Vdd can comprise a variable resistor making it possible to adjust the power supply voltage either to the nominal voltage or to the voltage lower than the nominal voltage.

Thus, when the first switch is connected to the first circuit of nominal voltage, the first antenna B1 is powered by a nominal voltage. The first antenna B1 emits the first low-frequency field D1 to the central unit 12, as in the prior art.

When the first switch S1 is connected to the second circuit, the first antenna B1 is powered by a voltage very much lower than the nominal voltage. In this case, the first antenna B1 then emits a new low-frequency field D1' of short range, insufficient to be received by the wheel unit 13, but of sufficient range to be received by the second antenna B2, situated in proximity to the first antenna B1. In effect, the second antenna B2 is situated in the zone of reception of the new low-frequency field D1' emitted by the first antenna B1, regardless of the power supply voltage of the first antenna B1, even if the latter is lower than the nominal voltage. In a preferential embodiment, the first and second antennas B1, B2 are coaxial and wound around the same ferrite F' (cf. FIG. 5).

The ferrite F' makes it possible to increase the intensity of the low-frequency fields D1, D2, D2' emitted by the first and the second antennas B1, B2.

The second antenna B2 is therefore then electromagnetically coupled to the first antenna B1 and it emits, by resonance, the second and third radiofrequency fields D2, D2'.

To this end, the second antenna B2 is connected to means for adapting its frequency f' to the frequency f of the first antenna B1.

The means M1 for adapting the frequency f' of the second antenna B2 comprise, for example:
  a second switch S2, connected on one side to a first end of the second antenna B2, and on the other side to a frequency adaptation circuit comprising:
    an adaptation element, for example a capacitor C2 linked to the switch S2,
    a third resistor R3 linked on one side to the capacitor C2 and on the other side to a second end of the second antenna B2.

When the second switch S2 is closed, the second antenna B2 is linked to the frequency adaptation circuit, that is to say connected in series, to the capacitor C2 and to the resistor R3.

The value of the capacitor C2 is determined in order to adjust the frequency f' of the second antenna B2 to the frequency f of the first antenna B1. Thus, the second antenna B2 is a resonant antenna, which, when the second switch S2 is closed and the first switch S1 is connected to the first circuit, receives a part of the new low-frequency field D1' emitted by the first antenna B1 and in turn emits a second and third low-frequency field D2, D2' at the same frequency f.

The resistor R3 is optional, it is of low value in order not to limit the voltage circuiting through the second antenna B2 and not to limit the range of the second and third low-frequency fields D2, D2'.

Thus, the second and third low-frequency fields D2, D2' are of sufficient range to be received by the central unit 12.

The operation of the wheel 11 electronic unit 13 according to the invention is described below.

In a first step, the first switch S1 is in a first position in which it electrically links the voltage generator G to the first circuit (in which the resistor R1 is of low value). The second switch S2 is open, the second antenna B2 is not operating. The first antenna B1 emits a first low-frequency field D1 oriented along the axis Y.

In a second transition step, the first switch is disconnected from the first circuit.

In a third step, the first switch S1 is in a second position in which it electrically links the voltage generator G to the second circuit (in which there is a resistor R2 of higher value than the resistor R1). The second switch S2 is then closed simultaneously, and the second antenna B2 operates as a resonant antenna. The first antenna B1 emits a new low-frequency field D1' oriented along the axis Y but of very short range. The second antenna B2 receives the new low-frequency field B1' emitted by the first antenna B1 and in turn emits, by resonance, a second and third low-frequency field D2, D2', both at right angles to the axis Y, to the central unit 12 at the same frequency f.

In a fourth transition step, the first switch S1 is disconnected from the second circuit and the second switch S2 is open.

The steps 1 to 4 are repeated continuously over a wheel revolution.

The first and the third steps are of predetermined durations, t1, t2, which can be equal to one another, for example 20 ms.

The method for transmitting low-frequency waves from the emitting unit 20' to the wheel unit 13 according to the invention therefore comprises the following steps:
  step 1: activation of the regulation means M2 in order to power the first antenna B1 with a nominal voltage for a first predetermined duration t1,
  step 2: deactivation of the regulation means M2,
  step 3: activation of the regulation means M2 in order to power the first antenna B1 with a voltage lower than the nominal voltage and activation of the adaptation means M1 simultaneously for a second predetermined duration t2,
  step 4: deactivation of the regulation means M2 and deactivation of the adaptation means M1 simultaneously.
  step 5: repetition of steps 1 to 4.

In step 1, "activation of the regulation means" should be understood to mean the connection between the first switch S1 and the first circuit of nominal voltage in order to power the first antenna B1 with a nominal voltage.

In step 2, the deactivation of the regulation means that the first switch S1 is no longer linked electrically to any circuit.

In step 3, the activation of the regulation means that the first switch S1 is linked electrically to said second circuit, thus powering the first antenna B1 with a voltage lower than the nominal voltage. It is accompanied by the simultaneous activation of the adaptation means M1 which means the closure of the second switch S2, to connect the second antenna B2 to the frequency adaptation circuit, comprising the capacitor C2 and the resistor R3.

The activation and the deactivation of the regulation means and of the adaptation means are controlled by the control means M3 incorporated in the microcontroller 20'.

Thus, the wheel unit 13' according to the invention sequentially emits a first low-frequency field D1 oriented along the axis Y, then a second and third low-frequency field D2, D2' at right angles to the axis Y.

Figure 6:
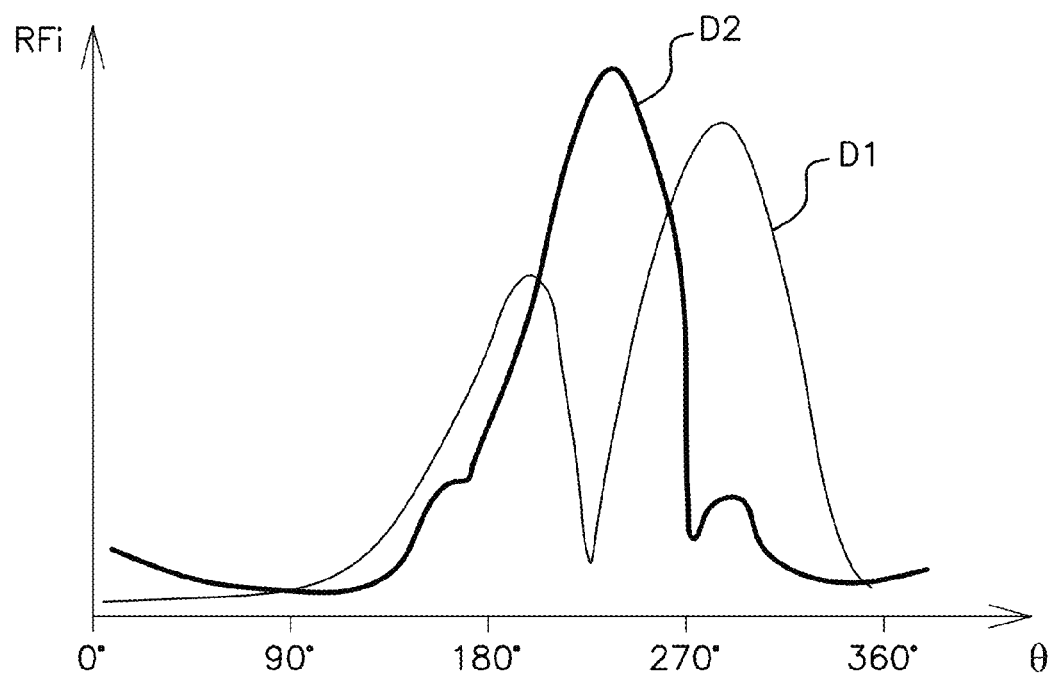
FIG. 6 represents a schematic view of the intensity of the low-frequency signal received by the wheel unit, according to the invention.

FIG. 6 shows the reception pattern of the wheel unit 13 according to the invention, that is to say the intensity Rfi of the low-frequency LF signals received over a wheel revolution. The first field D1, emitted by the first antenna B1, exhibits a rupture zone Zo at 225°, the second field D2, emitted by the second antenna B2, exhibits a second rupture zone Zo2 at 270°. The field formed by the joining of said two low-frequency fields D, D2 does not exhibit any rupture zone over a wheel revolution. By alternating the emission of the low-frequency LF waves from the emitting unit 20', by the first antenna B1, then by the second antenna B2, there is no longer any rupture zone over a wheel revolution.

Thus, the probability of reception of the low-frequency LF signals by the wheel unit 13 over a wheel revolution is increased. The rupture zone Zo is considerably reduced, even eliminated. Since the second antenna B2 is passive, it is inexpensive, and also as it is oriented along the same axis Y as that of the first antenna B1, and not at right angles to said first antenna B1, the bulk of the emitting unit 20' according to the invention is reduced.

The invention therefore allows for the reliable transmission of low-frequency LF signals between the emitting unit and the wheel unit over a complete wheel revolution, without the presence of any rupture zone.

The invention claimed is:

1. A low-frequency emission electronic unit (20') emitting to a mobile wheel electronic unit (13) of a vehicle (V), fixed to said wheel (11), said low-frequency emission electronic unit comprising:
  a microcontroller (30)
  a first low-frequency (f) emission antenna (B1), oriented along an axis (Y), connected to the microcontroller (30), having a power supply voltage (Vdd), and emitting a first low-frequency field (D1, D1'),
said low-frequency emission electronic unit (20') further comprising:
  a second passive low-frequency antenna (B2) arranged along the axis (Y) of the first antenna (B1), situated in a zone of reception of the first low-frequency field (D1, D1'), regardless of the power supply voltage of the first antenna (B1), and comprising a first part (B2a) and a second part (B2b), electrically linked together, separated by a gap (E) having a length (l), the two parts (B2a, B2b) being adapted to emit low-frequency fields of opposite directions (C2a, C2b), and directed toward one another,
  means (M1) for adapting a frequency (f') of the second antenna (B2) to the frequency (f) of the first antenna (B1),
  means (M2) for regulating the power supply voltage (Vdd) of the first antenna (B1).

2. The low-frequency emission electronic unit (20') as claimed in claim 1, wherein the first antenna (B1) and the second antenna (B2) are coaxial and wound around the same ferrite (F').

3. The low-frequency emission electronic unit (20') as claimed in claim 1, wherein the voltage regulation means (M2) comprise a first two-way switch (S1), connected on one side to a voltage generator (G) incorporated in the microcontroller (30), and connected on the other side to:
  a first circuit of nominal voltage, comprising a first resistor (R1),
  a second circuit of voltage lower than the nominal voltage, comprising a second resistor (R2);
the first switch (S1) having a first position in which the first antenna (B1) is connected to the first circuit and a second position in which the first antenna (B2) is connected to the second circuit.

4. The low-frequency emission electronic unit (20') as claimed in claim 1, wherein the adaptation means (M1) comprise:
  a second switch (S2),
  a frequency adaptation circuit comprising:
    a capacitor (C2),
    a third resistor (R3),
the second switch (S2) having a closed position in which the second antenna (B2) is connected to the adaptation circuit and an open position in which the second antenna (B2) is disconnected from the adaptation circuit.

5. The low-frequency emission electronic unit (20') as claimed in claim 1, wherein a length (l1) of the first part (B2a) is equal to a length (l2) of the second part (B2b) and the length (l) of the gap (E) is between $\frac{1}{8}^{th}$ and $\frac{5}{8}^{th}$ of the length (l1) of the first part (B2a) or of the length (l2) of the second part (B2b).

6. A method for transmitting low-frequency signals to a mobile wheel electronic unit (13) of a vehicle (V), fixed to said wheel (11), comprising:
  in a preliminary step, using a low-frequency emission electronic unit (20') comprising a microcontroller (30), first low-frequency emission antenna (B1) of frequency f, oriented along an axis (Y), connected to the microcontroller (30), having a power supply voltage (Vdd), and emitting a first low-frequency field (D1, D1'), a second passive low-frequency antenna (B2) arranged along the axis (Y) of the first antenna (B1), situated in a zone of reception of the first low-frequency field (D1, D1'), regardless of the power supply voltage of the first antenna (B1), and comprising a first part (B2a) and a second part (B2b), electrically linked together, separated by a gap (E) having a length (l), the two parts (B2a, B2b) being adapted to emit low-frequency fields of opposite directions (C2a, C2b), and directed toward one another, adapting a frequency (f') of the second antenna (B2) to the frequency (f) of the first antenna (B1), regulating the power supply voltage (Vdd) of the first antenna (B1) making it possible to regulate the power supply voltage of the first antenna (B1) either to a nominal voltage, or to a voltage lower than the nominal voltage, and
said method comprises the following steps:
  step 1: activation of a regulation means (M2) in order to power the first antenna (B1) with a nominal voltage for a first predetermined duration (t1),
  step 2: deactivation of the regulation means (M2),
  step 3: activation of the regulation means (M2) in order to power the first antenna (B1) with a voltage lower than the nominal voltage and activation of an adaptation means (M1) simultaneously for a second predetermined duration (t2),
  step 4: deactivation of the regulation means (M2) and deactivation of the adaptation means (M1) simultaneously,
  step 5: repetition of the steps 1 to 4.

7. The transmission method as claimed in claim 6, wherein the means for adapting a frequency (M1) comprise: a second switch (S2); a frequency adaptation circuit comprising: a capacitor (C2), and a third resistor (R3), the second switch (S2) ving a closed position in which the second antenna (B2) is connected to the adaptation circuit and an open position in which the second antenna (B2) is disconnected from the adaptation circuit, and wherein:
- step 1 consists in connecting the first switch (S1) to the circuit of nominal voltage,
- step 2 consists in disconnecting the first switch (S1) from the circuit of nominal voltage,
- step 3 consists in connecting the first switch (S1) to the circuit of voltage lower than the nominal voltage and in closing the second switch (S2),
- step 4 consists in disconnecting the first switch (S1) from the circuit of voltage lower than the nominal voltage simultaneously with the opening of the second switch (S2).

8. A system for monitoring the pressure of the tires, comprising the low-frequency emission electronic unit (20') as claimed in claim 1, a central unit (12), and at least one wheel electronic unit (13).

9. A motor vehicle in combination with the low-frequency emission electronic unit (20') as claimed in claim 1.

* * * * *